United States Patent
Skowronski et al.

(10) Patent No.: US 8,123,010 B2
(45) Date of Patent: Feb. 28, 2012

(54) RETRACTABLE CORD REEL

(75) Inventors: Richard Skowronski, North Hampton, NJ (US); Paul C. Burke, Waukegan, IL (US)

(73) Assignee: Telefonix, Incorporated, Waukegan, IL (US)

(*) Notice: Subject to any disclaimer, the term of this patent is extended or adjusted under 35 U.S.C. 154(b) by 263 days.

(21) Appl. No.: 12/573,854

(22) Filed: Oct. 5, 2009

(65) Prior Publication Data

US 2011/0079676 A1    Apr. 7, 2011

(51) Int. Cl.
*B65H 75/44* (2006.01)
(52) U.S. Cl. ................. 191/12.2 R; 242/396.4
(58) Field of Classification Search ........... 242/396.2, 242/396.4; 191/12.2 R
See application file for complete search history.

(56) References Cited

U.S. PATENT DOCUMENTS

| | | | | |
|---|---|---|---|---|
| 3,657,491 A * | 4/1972 | Ryder et al. | | 191/12.2 R |
| 3,854,017 A * | 12/1974 | Crim | | 191/12.2 R |
| 3,904,843 A * | 9/1975 | Kendechy | | 200/332 |
| 4,350,850 A * | 9/1982 | Kovacik et al. | | 191/12.2 R |
| 5,535,960 A * | 7/1996 | Skowronski et al. | | 242/378.4 |
| 5,645,147 A * | 7/1997 | Kovacik et al. | | 191/12.2 R |
| 5,718,310 A * | 2/1998 | Gallo | | 191/12.2 R |
| 2006/0006038 A1 * | 1/2006 | Beverlin | | 191/12.2 R |

* cited by examiner

*Primary Examiner* — Sang Kim
(74) *Attorney, Agent, or Firm* — Niro, Haller & Niro

(57) ABSTRACT

A retractable cord reel is disclosed. The retractable cord reel may have a spool having a conductor carried thereon. The cord reel may also have a conductor lead coupled to a ratchet. The spool and the ratchet may be configured to make an electrical connection with each other.

4 Claims, 5 Drawing Sheets

RETRACTABLE CORD REEL

FIELD OF THE INVENTION

The present invention relates generally to a retractable cord reel apparatus, and more specifically relates to a retractable cord reel having a ratchet assembly near a perimeter of the cord reel.

BACKGROUND OF THE INVENTION

Retractable cord reels have been used in various applications to retractably store various types of cables. Typically, a reel might have a stationary end and a retractable end, the retractable end capable of extension from and retraction back into the reel. Such a configuration eliminates the mess typically associated with loose wires, as well as dangers.

In one prior art retractable reel, the extendable and stationary portions of a cord may be separate cords, but may be connected, for example, by brush-like contacts. The brush-like contacts are typically configured to slide along the inside or outside of the rotating spool, effectively maintaining a continuous contact between the moving parts.

A second type of retractable cord reel has been developed that maintains a constant connection between the retractable and stationary ends of the cord without the use of brushes. The reel illustratively contains a spool divided into two chambers: one for holding a round retractable cord, and a second, expansion chamber holding a coil of flat cord that can be expanded within the reel housing. The retractable cord is connected to the stationary end through this internal coil, which may expand through its chamber during rotation of the spool. An example of this type of reel is disclosed in U.S. Pat. No. 5,094,396 to Burke, the disclosure of which is hereby incorporated by reference.

The expansion cord length may be minimized by permitting expansion of the cord followed by a reverse-direction contraction of the cord. This process is illustrated in U.S. Pat. No. 6,372,988 to Burke, the disclosure of which is hereby incorporated by reference.

SUMMARY OF THE INVENTION

The present invention relates to one or more of the following features, elements or combinations thereof.

A retractable cord reel capable of carrying electrical power, electrical signals, or both is disclosed. The retractable cord reel includes a ratchet that pivots so as to provide an engaged position and a disengaged position. In the engaged position, the ratchet provides a connection between the retractable cord and a stationary cord. In the disengaged position, the ratchet permits extension and retraction of the retractable cord. In the disengaged position, the retractable cord is not connected to the stationary cord.

In one embodiment, the retractable cord reel includes a housing, a spool positioned within the housing and arranged for rotation relative to the housing, a stationary cord extending from the housing, a retractable cord capable of being extended from and retracted into the housing and further capable of being in electrical communication with the stationary cord, and a ratchet mounted on the housing. In an illustrative embodiment, the ratchet has an engaged position wherein the ratchet is in electrical communication with the spool and the ratchet also has a disengaged position, wherein the ratchet is not in electrical communication with the spool.

In another embodiment, a ratchet is positioned to selectively engage the spool. A retractable cord is at least partially wound around the spool such that the retractable cord is extendable from the housing. Furthermore, an electrical current is passed through a conductor coupled to the spool.

In yet another embodiment, a base is provided. The spool is positioned on the base and arranged for rotation relative to the base. A conductor lead is coupled to the base, the conductor lead being configured to have intermittent electrical communication with the spool.

DETAILED DESCRIPTION OF EMBODIMENTS OF THE INVENTION

Figure 1:
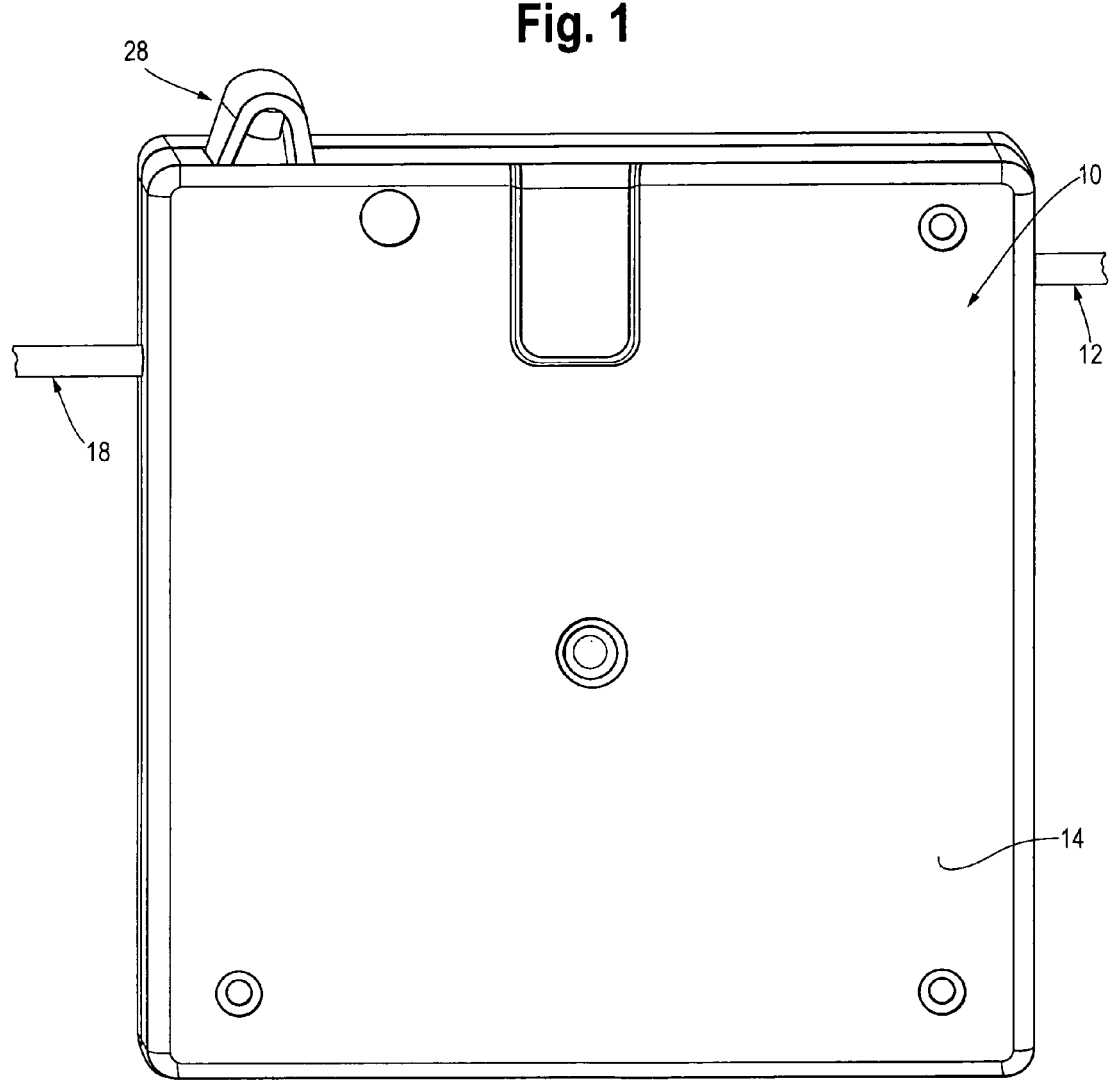
FIG. 1 is front view of a retractable cord reel assembly.

As can be seen in FIG. 1, the present invention comprises a retractable cord reel assembly 10 for managing and organizing a retractable cord 12. It is contemplated that retractable cord 12 could be a data line, a telephone line, an electric cable or power cord, or any other cable and/or wire or combination thereof for which retraction into a housing could be desirable.

Assembly 10 illustratively includes a housing 14 that houses a spool 16 (shown in FIG. 2) therein. A stationary cord 18 extends from housing 14 and may, for example, have a traditional plug such as a three-prong plug attached at its distal end. In another embodiment, stationary cord 18 may have a data connection or a plurality of connectors attached at its distal end. It is further contemplated that a combination of connectors or plugs could be provided at the distal end of stationary cord 18, such that cord reel assembly could deliver data signals and electrical power. In yet another embodiment, a plurality (not shown) of stationary cords 18 could be provided. However, regardless of the number of connectors and conductors, it is contemplated that most applications would require only a single retractable cord 12, thereby benefitting from some of the advantages of the simplified and de-cluttered cord reel assembly.

Figure 2:
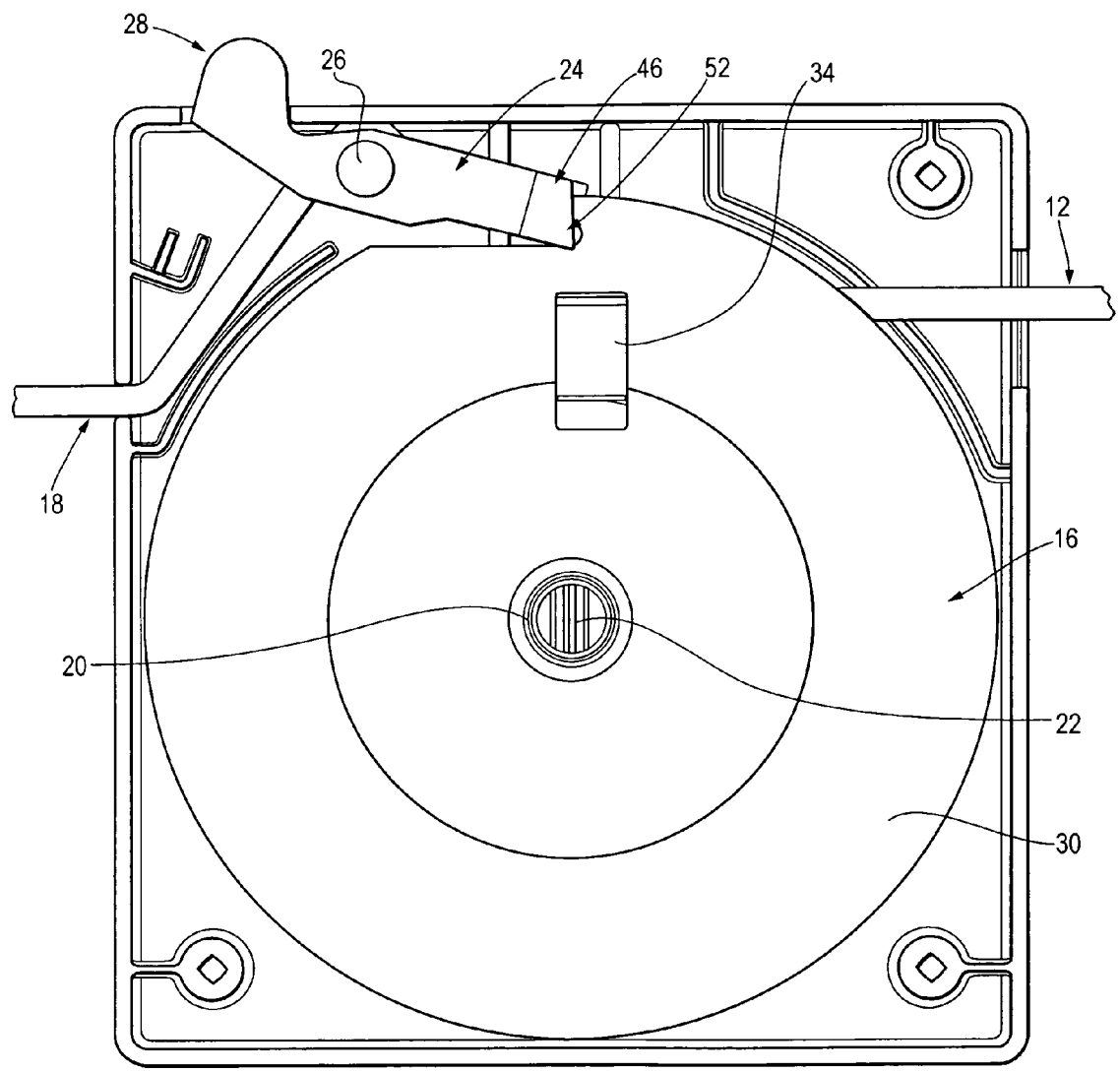
FIG. 2 is a front view of the retractable cord reel assembly of FIG. 1, showing the housing cover removed to expose the internal spool.

As can be seen in FIG. 2, when the front cover of housing 14 is removed, the internal spool 16 is shown positioned on hub 20 such that spool 16 is permitted to rotate about axis 22. Also visible in FIG. 2 is ratchet 24, which is positioned to be pivotable about ratchet axis 26. Ratchet 24 is illustratively configured to have a button portion 28 (also visible in FIG. 1) that extends beyond the perimeter of housing 14, such that a user can depress button portion 28 to pivot ratchet 24 about ratchet axis 26.

As can be seen in FIG. 2, stationary cord 18 is illustratively connected to ratchet 24, as described in further detail below. Stationary cord 18 may be secured to housing 14 to prevent the detachment of stationary cord 18 from ratchet 24.

Figure 3:
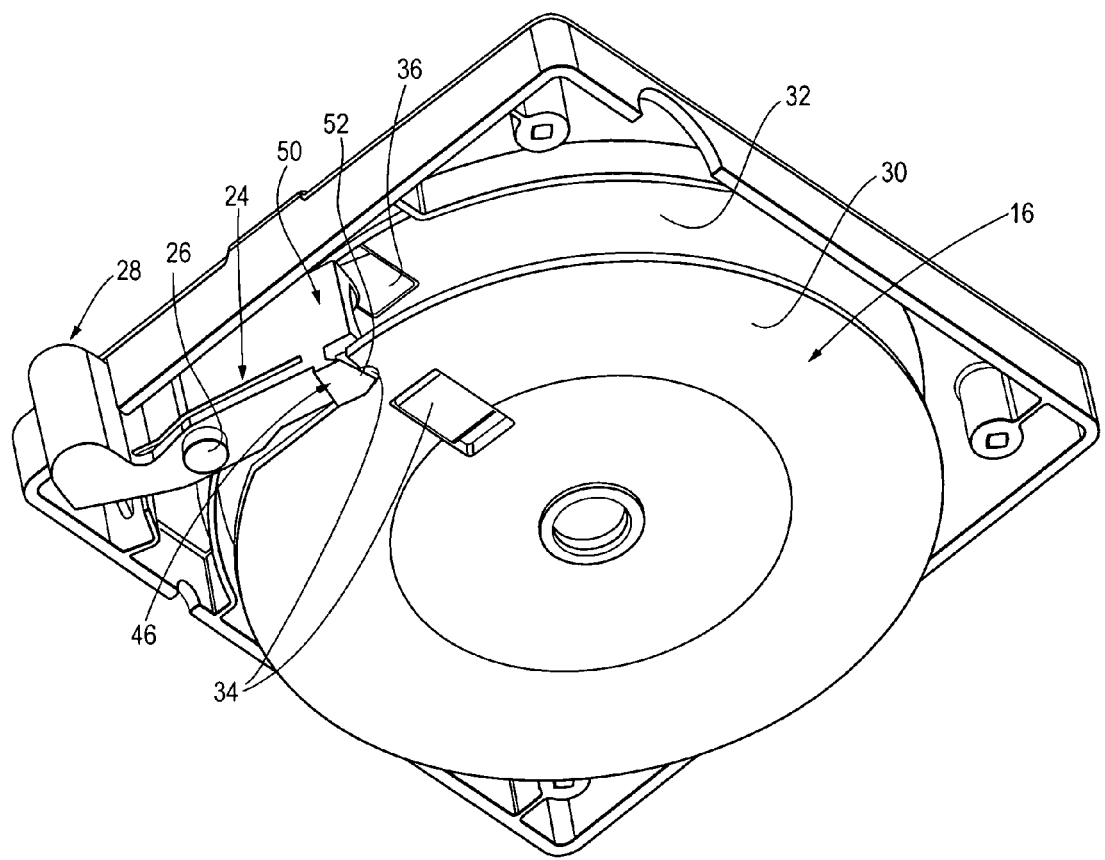
FIG. 3 is a top perspective view of the assembly of FIGS. 1-2, showing the alignment of a ratchet with the internal spool.

FIG. 3 shows a top perspective view of spool 16 and ratchet 24, showing the alignment of ratchet 24 with front and rear spool walls 30, 32. For illustration purposes, retractable cord 12 and stationary cord 18 have been removed from the embodiment shown in FIG. 3.

In the illustrative embodiment, each of front and rear spool walls 30, 32 has a respective front and rear conductor 34, 36 positioned radially along a portion of the spool walls. Ratchet 24 also has a front conductor lead 38 (shown in FIGS. 4-5) and a rear conductor lead 40 (also shown in FIGS. 4-5). In the engaged position shown in FIG. 3, ratchet 24 is engaged with spool 16 such that front conductor lead 38 is in contact with front conductor 34 and rear conductor lead 40 is in contact with rear conductor 36. Such contact between conductor leads 38, 40 and conductors 34, 36 could be sufficient for data connectivity or electrical connectivity or both. It should be understood that additional conductors can also be provided, for example on the opposite surfaces of front and rear spool walls 30, 32 (with corresponding additional conductor leads on ratchet 24).

Figure 4:
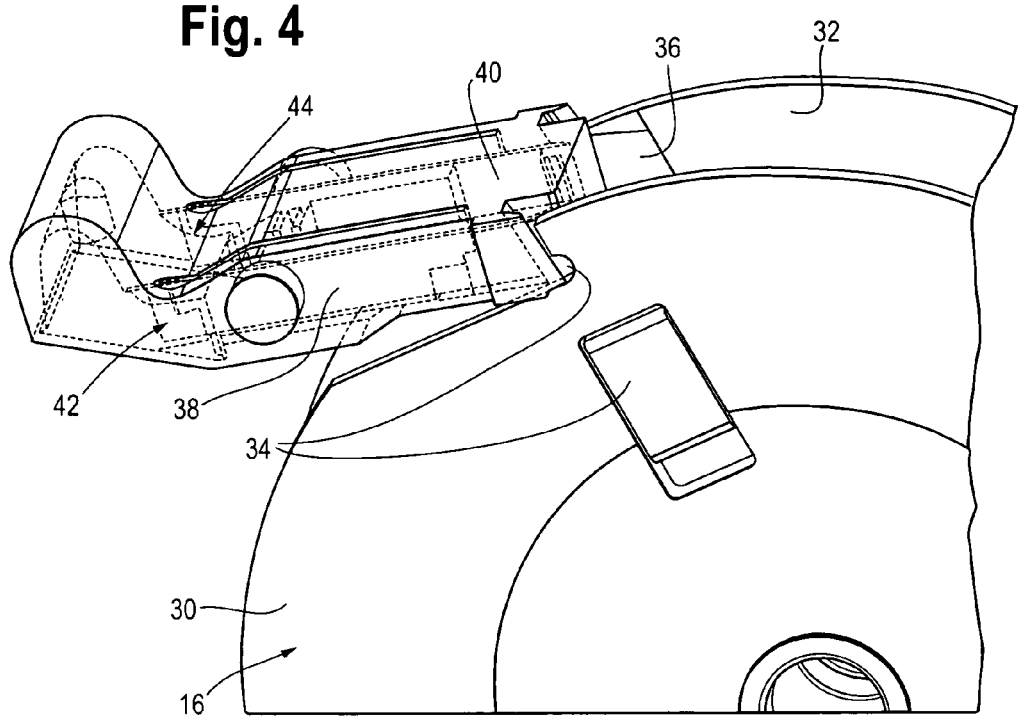
FIG. 4 is an enlarged perspective view of the ratchet and a portion of the spool of FIG. 3.

FIG. 4 shows an enlarged view of the ratchet in its engaged position with spool walls 30, 32, wherein ratchet 24 has been made transparent for illustrative purposes. As can be seen in the illustrated embodiment, ratchet 24 carries front conductor lead 38 and rear conductor lead 40 along a substantial portion of the length of the ratchet 24. Front and rear conductor leads 38, 40 are illustratively connected at distal ends 42, 44 to stationary cord 18 (as shown in FIG. 2 and described above).

Figure 5:
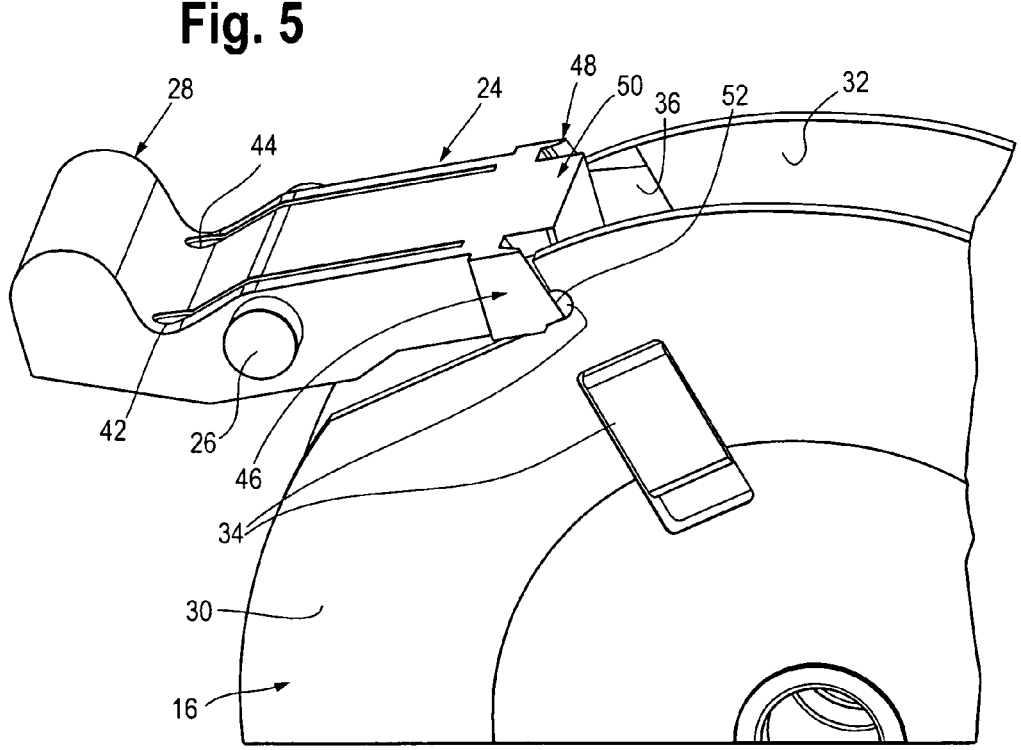
FIG. 5 is another enlarged perspective view of the ratchet and spool shown in FIGS. 3-4.

As can be seen in FIG. 5, ratchet 24 is illustratively configured to have a front tooth 46 and a rear tooth 48 that extend over front conductor 34 and rear conductor 36, respectively, when engaged with spool 16. Ratchet 24 also illustratively has a central pier 50 that illustratively extends between front and rear spool walls 30, 32. Such a configuration assists with seating ratchet 24 in its proper placement with regard to spool 16, discussed in further detail herein.

Figure 6:
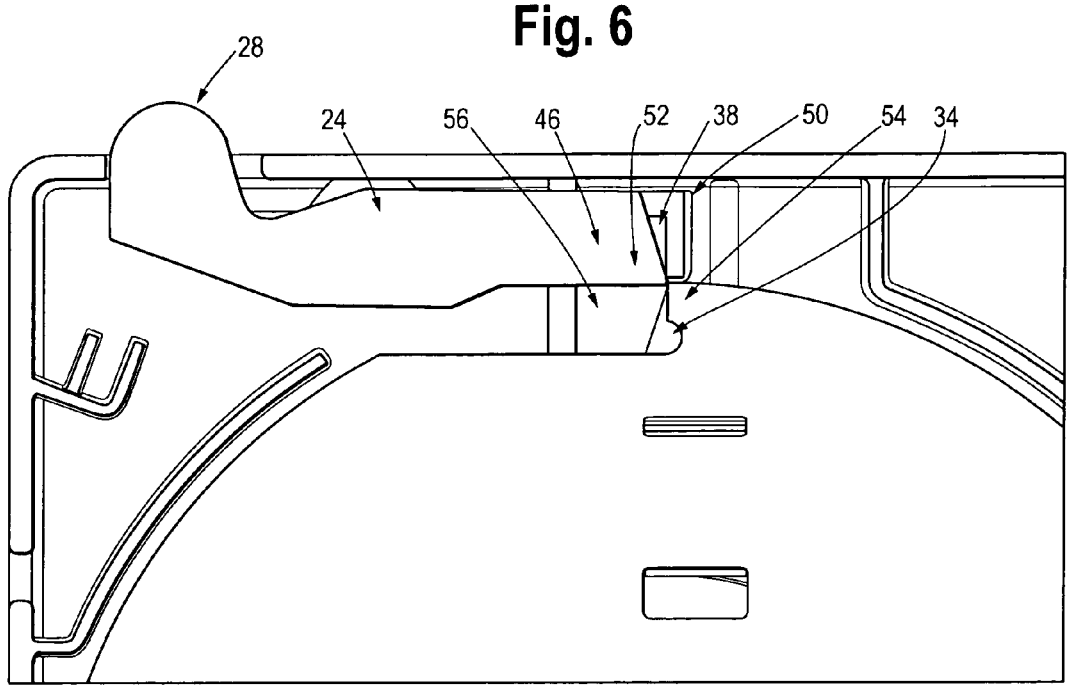
FIG. 6 is an enlarged front view of the ratchet and spool in operation.

As can be seen in FIG. 6, front and rear teeth 46, 48 illustratively have a lower portion 52 (not visible on rear tooth 48) that extends beyond the other portions of the front and rear teeth 46, 48. Front and rear teeth 46, 48 are also in substantially radial alignment with the circumference of front and rear spool walls 30, 32. Such a configuration causes ratchet 24 to ride along the circumference of front and rear spool walls 30, 32 when spool 16 is turned in a clockwise direction, as in when retractable cord 12 is extended from retractable cord reel assembly 10. Additionally, as ratchet 24 passes over corner 54 of spool 16, the lower portion 52 of front and rear teeth 46, 48 prevents the front and rear conductors 34, 36 from making contact with front and rear conductor leads 38, 40.

Figure 7:
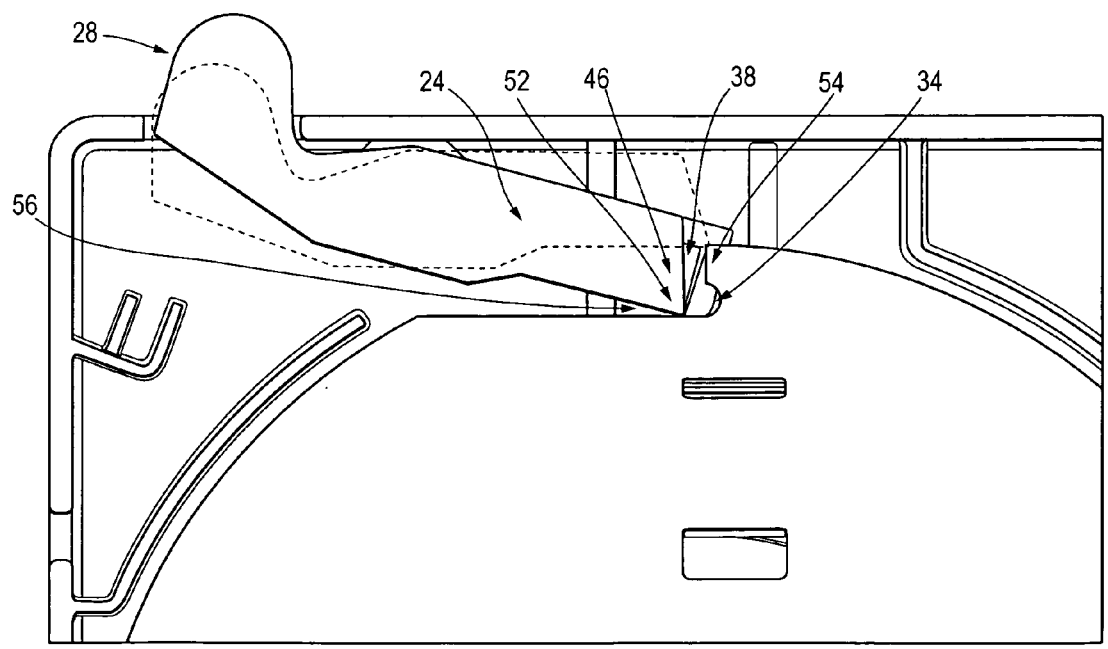
FIG. 7 is another enlarged front view of the ratchet and spool showing the ratchet disengaged from the conductors in the spool.

FIG. 7 demonstrates ratchet 24 after it has passed over corner 54 of spool 16, and after it has further dropped into groove 56. As can be seen in FIG. 7, conductors 34, 36 are still not in contact with conductor leads 38, 40. It is not until the desired length is reached that a user releases pressure on retractable cord 12, thereby allowing spring-loaded spool 16 to rotate counterclockwise again. Such counterclockwise rotation permits front and rear teeth 46, 48 to be positioned against corner 54, and further permits conductors 34, 36 to be positioned such that they are in contact with conductor leads 38, 40 (as was shown in FIGS. 2-5).

Each of front and rear conductors 34, 36 illustratively extends along its respective front and rear spool wall 30, 32 toward an inner portion of hub 20. Retractable cord 12 also extends inside hub 20 through an aperture (not shown), and splices into front and rear conductors 34, 36 within hub 20.

While the disclosure is susceptible to various modifications and alternative forms, specific exemplary embodiments thereof have been shown by way of example in the drawings and have herein been described in detail. It should be understood, however, that there is not intent to limit the disclosure to the particular embodiments disclosed, but on the contrary, the intention is to cover all modifications, equivalents, and alternatives falling within the spirit and scope of the disclosure as defined by the appended claims.

What is claimed is:

1. A retractable cord reel apparatus, the apparatus comprising
   a housing,
   a spool positioned within the housing and arranged for rotation relative to the housing, the spool having a conductor mounted thereon,
   a stationary cord extending from the housing,
   a retractable cord capable of being extended from and retracted into the housing and further capable of being in electrical communication with the stationary cord, and
   a ratchet mounted on the housing, the ratchet comprising a conductor lead having an engaged position wherein the conductor contacts the conductor lead and the ratchet having a disengaged position, wherein the ratchet is not in electrical communication with the spool.

2. The apparatus of claim 1 wherein the conductor is prevented from contacting the conductor lead when the retractable cord is being extended from the housing.

3. A retractable cord reel apparatus, the apparatus comprising
   a housing,
   a spool having a conductor coupled thereto, the spool being positioned within the housing and arranged for rotation relative to the housing,
   a ratchet positioned to selectively engage the spool, the ratchet comprising a conductor lead configured to make contact with the conductor on the spool, and
   a retractable cord being extendable from the housing,
   wherein an electrical current is passed through a conductor coupled to the spool.

4. The apparatus of claim 3, wherein the conductor is prevented from contacting the ratchet when the retractable cord is being extended from the housing.

* * * * *